(12) United States Patent
Zhao et al.

(10) Patent No.: US 12,393,072 B2
(45) Date of Patent: Aug. 19, 2025

(54) SPLICING SCREEN DISPLAY DEVICE

(71) Applicant: TCL CHINA STAR OPTOELECTRONICS TECHNOLOGY CO., LTD., Guangdong (CN)

(72) Inventors: Jun Zhao, Guangdong (CN); Bin Zhao, Guangdong (CN); Tingting Jiang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/618,426

(22) PCT Filed: Nov. 30, 2021

(86) PCT No.: PCT/CN2021/134285
§ 371 (c)(1),
(2) Date: Dec. 10, 2021

(87) PCT Pub. No.: WO2023/082367
PCT Pub. Date: May 19, 2023

(65) Prior Publication Data
US 2024/0036373 A1 Feb. 1, 2024

(30) Foreign Application Priority Data
Nov. 10, 2021 (CN) .......................... 202111324275.7

(51) Int. Cl.
*G02F 1/1333* (2006.01)
*G02F 1/1345* (2006.01)
*G09G 3/20* (2006.01)

(52) U.S. Cl.
CPC ...... *G02F 1/13336* (2013.01); *G02F 1/13452* (2013.01); *G09G 3/2096* (2013.01);
(Continued)

(58) Field of Classification Search
None
See application file for complete search history.

(56) References Cited

U.S. PATENT DOCUMENTS

| 2011/0109526 A1 | 5/2011 | Bauza et al. |
| 2016/0179453 A1* | 6/2016 | Jepsen .................. G06F 3/1446 345/1.3 |

(Continued)

FOREIGN PATENT DOCUMENTS

| CN | 102708840 A | * 10/2012 | .......... G09F 9/3026 |
| CN | 103985371 A | 8/2014 | |

(Continued)

OTHER PUBLICATIONS

Chinese Office Action in corresponding Chinese Patent Application No. 202111324275.7 dated Dec. 28, 2021, pp. 1-8.

*Primary Examiner* — Kirk W Hermann
(74) *Attorney, Agent, or Firm* — PV IP PC; Wei Te Chung (57) ABSTRACT

The present application discloses a display device and electronic device. The display device is configured by sequentially configuring the corresponding first bias current, second bias current, and third bias in a start period, a sustain period, and an end period. The current value of the first bias current is greater than the current value of the second bias current, and/or the current value of the third bias current is greater than the current value of the second bias current, which improves the display quality and reduces display power consumption.

18 Claims, 5 Drawing Sheets

(52) U.S. Cl.
CPC ............. *G09G 2300/026* (2013.01); *G09G 2310/0232* (2013.01); *G09G 2370/00* (2013.01)

(56) References Cited

U.S. PATENT DOCUMENTS

| | | | |
|---|---|---|---|
| 2016/0267860 A1* | 9/2016 | Liu | G09G 3/32 |
| 2018/0018931 A1* | 1/2018 | Zhang | G09G 5/397 |
| 2021/0109389 A1* | 4/2021 | Fan | G02F 1/1362 |
| 2022/0013064 A1* | 1/2022 | Chang | G09G 3/006 |
| 2022/0343831 A1* | 10/2022 | Li | G09G 3/3666 |
| 2022/0365738 A1* | 11/2022 | Li | G09G 3/32 |

FOREIGN PATENT DOCUMENTS

| | | |
|---|---|---|
| CN | 104361837 A | 2/2015 |
| CN | 106373493 A | 2/2017 |
| CN | 208384939 U | 1/2019 |
| CN | 111506284 A | 8/2020 |
| CN | 113496686 A | 10/2021 |
| KR | 20200089385 A | 7/2020 |
| WO | 2012036081 A1 | 3/2012 |

* cited by examiner

SPLICING SCREEN DISPLAY DEVICE

BACKGROUND OF INVENTION

Field of Invention

The present disclosure relates to the field of display, in particular to a splicing screen display device.

Description of Prior Art

With development of electronics industry, demands for various super-large-sized display devices are increasing day by day, and applications in various scenarios are becoming more and more extensive. Therefore, splicing screen display devices such as liquid crystal display (LCD) splicing screen display devices also getting more and more attention. In the splicing screen display devices, multiple LCD display screens may be spliced to form a super-sized display screen for image display according to actual display needs, which have advantages of clear image display and high flexibility.

At present, since the splicing screen display device integrates a variety of different types of display modules, various functional elements that are matched with the display module are arranged inside the splicing screen display device, resulting in insufficient internal space of the device.

SUMMARY OF INVENTION

Embodiments of the present disclosure provide a splicing screen display device, which can solve the technical problem of insufficient internal space caused by too many integrated components in the splicing screen display device in the prior art.

An embodiment of the present disclosure provides a splicing screen display device, and the splicing screen display device includes:

display modules including a plurality of basic display modules and at least one supplementary display module, wherein the supplementary display module is disposed at a joint of two of the basic display modules;

a processing module connected to the display modules with electrical signals and configured to perform a first process on a received source image frame to obtain a target sub-image frame corresponding to each of the display modules;

a transmitting module connected to the processing module with electrical signals and configured to receive and perform a second process on a target sub-supplemental image frame transmitted by the processing module, wherein the target sub-supplemental image frame is the target sub-image frame corresponding to the supplementary display module; and a driving module disposed corresponding to the supplementary display module, and connected to the transmitting module and the supplementary display module with electrical signals, wherein the driving module includes a substrate, and a driving unit and a distribution unit integrated on the substrate, the driving unit is connected to the distribution unit with electrical signals, the driving unit is configured to perform a third process on the received target sub-supplemental image frame and transmit the received target sub-supplemental image frame to the distribution unit; and wherein the distribution unit is connected to the supplementary display module with electrical signals, and the distribution unit is configured to receive the target sub-supplementary image frame processed by the driving unit and distributes the target sub-supplementary image frame to a corresponding one of the supplementary display module for the supplementary display module to display.

In some embodiments of the present disclosure, the driving module further includes:

a port unit connected to the driving unit and the transmitting module with electrical signals and configured to receive the target sub-supplemental image frame transmitted by the transmitting module, and transmit the target sub-supplemental image frame to the driving unit.

In some embodiments of the present disclosure, the supplementary display module includes a plurality of supplementary display units, and the distribution unit correspondingly includes a plurality of display connectors, the display connectors are disposed on a same side, and the display connectors are docked and fixed to a corresponding one of the supplementary display units to realize electrical signal connection.

In some embodiments of the present disclosure, the driving module includes a driving board, and the driving board includes the substrate, and the port unit, the driving unit, and the distribution unit disposed on the substrate.

In some embodiments of the present disclosure, the driving board includes: a main driving board including the substrate, the port unit, the driving unit, the distribution unit, and an expansion connector; and an auxiliary driving board disposed at one side of the main driving board along the joint, and including the substrate, the distribution unit, and the expansion connector, wherein the main driving board is docked and fixed to the auxiliary driving board through the expansion connector to realize electrical signal connection, and the driving board further includes the port unit, the driving unit.

In some embodiments of the present disclosure, after receiving the target sub-supplemental image, and after the third process is performed through the driving unit on the main driving board, the target sub-supplemental image is converted into an image signal that can be displayed by each of the supplementary display unit, the image signal is correspondingly distributed to the display interface on the supplementary display unit, and the supplementary display unit is made to display through the display interface In some embodiments of the present disclosure, the main driving board transmits a processed image signal to the auxiliary driving board through the expansion interface, the processed image signal is distributed to each of the display interfaces on the auxiliary driving board, so that the supplementary display unit docked on the auxiliary drive board also displays In some embodiments of the present disclosure, the display connectors are disposed at one side of the substrate along the joint, and the expansion connector is disposed on the substrate at another side of the substrate adjacent to the side where the display connectors are disposed at.

In some embodiments of the present disclosure, the supplementary display units are disposed in strips along the joint, a border width of each of the supplementary display units is less than 5 mm, and a pixel width of each of the display units is greater than a sum of widths of 8 pixels.

In some embodiments of the present disclosure, a distance between adjacent ones of pixels of adjacent ones of the supplementary display units is less than 0.63 mm.

In some embodiments of the present disclosure, the driving module includes a plurality of driving submodules, each of the driving submodules includes a main driving submodule and an auxiliary driving submodule disposed at one side of the main driving submodule along the joint, and the main driving submodule transmits the target sub-supplemental image to the auxiliary driving sub-module.

In some embodiments of the present disclosure, the port unit is disposed on each of the main driving submodule and the auxiliary driving submodule, and the port unit includes a receiving port and a transmitting port;

wherein the receiving port of the main driving submodule is a main receiving port, the receiving port of the auxiliary driving submodule is an auxiliary receiving port, and the transmitting port of the main driving submodule is a main transmitting port; and wherein the main receiving port is connected to the transmitting module with electrical signals and configured to receive the target sub-supplemental image frame transmitted by the transmitting module, the main transmitting port is connected to the main receiving port and the auxiliary receiving port with electrical signals and configured to transmit the target sub-supplementary image frame received by the main receiving port to the auxiliary receiving port.

In some embodiments of the present disclosure, a number of auxiliary driving submodules is multiple, and the main driving submodule and each of the auxiliary driving submodules are connected by cascade connection.

In some embodiments of the present disclosure, the main driving submodule and each of the auxiliary driving submodules are arranged in sequence along the joint.

In some embodiments of the present disclosure, the driving submodule includes at least one driving board, and the at least one driving board includes: a main driving board including the substrate, the port unit, the driving unit, the distribution unit, and an expansion connector; an auxiliary driving board disposed at one side of the main driving board along the joint, and including the substrate, the distribution unit, and the expansion connector, wherein the main driving board is docked and fixed to the auxiliary driving board through the expansion connector to realize electrical signal connection.

In some embodiments of the present disclosure, the supplementary display module includes a plurality of supplementary display submodules corresponding to the main driving submodule and the auxiliary driving submodules, and each of the main driving submodule and the auxiliary driving submodules is respectively correspondingly connected to the supplementary display submodules with electrical signals In some embodiments of the present disclosure, each supplementary display submodule correspondingly includes a plurality of supplementary display units.

In some embodiments of the present disclosure, the processing module includes:

a receiving submodule configured to obtain the source image frame and a resolution information of the splicing screen display device, wherein the resolution information includes a pixel width of the supplementary display module, and the pixel width is a pixel size of the supplementary display module at the joint in a width direction;

a processing submodule configured to add a border display area at an outer side of the source image frame and split the source image frame to form the target sub-image frame corresponding to each of the display modules, wherein the border display area is parallel to the joint, and a sum of pixel widths of the border display area that are parallel to each other is equal to a sum of pixel widths of the supplementary display module that are parallel to each other; and a transmitting submodule configured to transmit each of the target sub-image frame to a corresponding one of the display modules for display.

In some embodiments of the present disclosure, the splicing screen display device is a display screen formed by a plurality of basic display modules arranged in a straight line, and the border display area is arranged at least one outer side of the source image frame parallel to the joint.

In some embodiments of the present disclosure, the splicing screen display device is a display screen constituted by a plurality of basic display modules arranged in a rectangular array, and the border display area is arranged at the adjacent two of the outer sides of the source image frame.

In the embodiments of the present disclosure, a driver card responsible for converting the received signal into an image that the display module can display in the driving module is converted into a driving unit, while a distribution card responsible for distributing the source image frame to the display unit is converted into a distribution unit, and then, the driving unit and the distribution unit are integrated on a substrate, to effectively save a space in the display device and solve the technical problem of insufficient internal space of the device caused by too many integrated components in the splicing screen display device. Meanwhile, the integration of the driving unit and the distribution unit also effectively shortens the time of information transmission, which can further ensure synchronization of display images of each of the display modules.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

Elements in the drawings are designated by reference numerals listed below.

100, display module; 110, basic display module; 120, supplementary display module; 121, supplementary display submodule; 1211, supplementary display unit; 130, joint; 200, processing module; 210, receiving submodule; 220, processing submodule; 230, transmitting submodule; 300, transmitting module; 400, driving module; 410, port unit;

420, driving unit; 430, distribution unit; 440, substrate; 450, expansion interface; 401, main driving submodule; 402, auxiliary driving submodule; 403, main driving board; 404, auxiliary driving board; 411, main receiving port; 412, main transmitting port; 413, auxiliary receiving port; 414, auxiliary transmitting port; 431, display interface; 800, source image frame; 910, target sub-image frame; 920, border display area; 911, sub-basic image frame; 912, target sub-supplementary image frame.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application. In addition, it should be understood that the specific implementations described here are only used to illustrate and explain the application, and are not used to limit the application. In the present application, unless otherwise stated, the orientation words used such as "upper" and "lower" generally refer to the upper and lower directions of the device in actual use or working state, and specifically refer to the drawing directions in the drawings, while "inner" and "outer" refer to the outline of the device.

Embodiments of the present disclosure provide a spliced image frame display device and a spliced image frame display method, which are described in details below. It should be noted that the order of description in the following embodiments is not meant to limit a preferred order of the embodiments.

The present disclosure provides a splicing screen display device, which can be applied to various indoor and outdoor super-large splicing screen display devices and various other devices that require a display interface.

Figure 1:
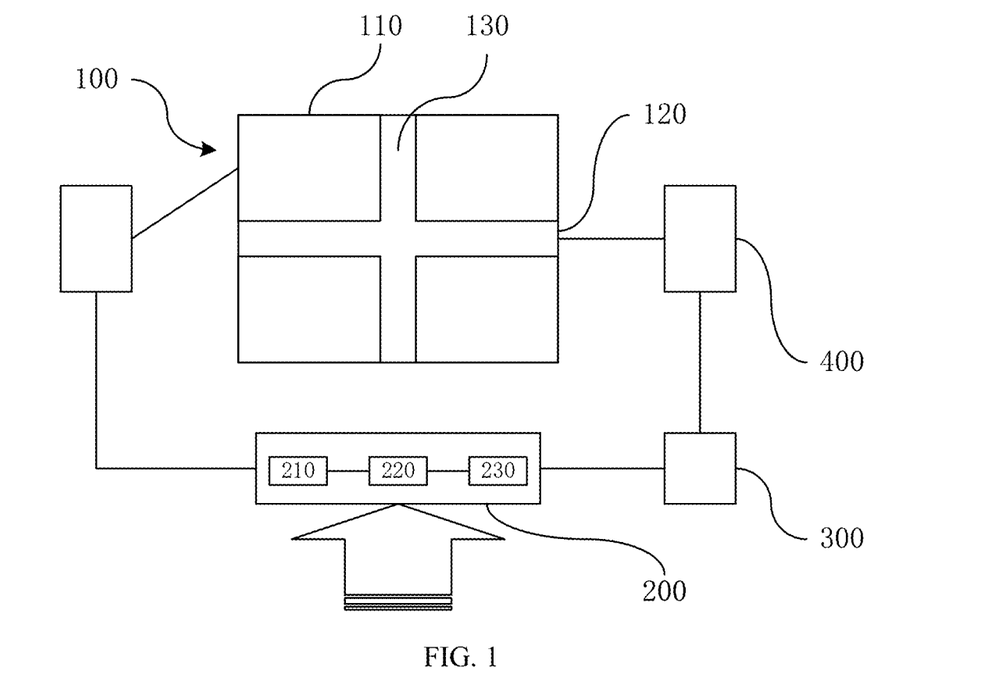
FIG. 1 is a schematic structural diagram of a splicing screen display device provided by an embodiment of the present disclosure.
Figure 2:
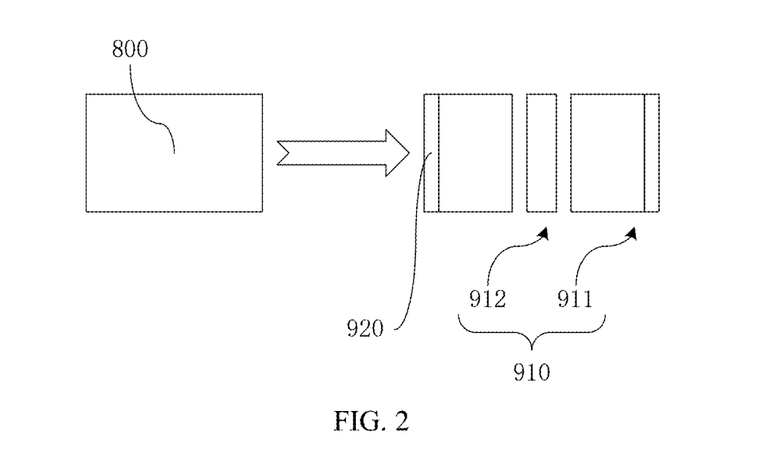
FIG. 2 is a schematic diagram of image changes in an embodiment of the splicing screen display device according to the embodiment corresponding to FIG. 1.
Figure 3:
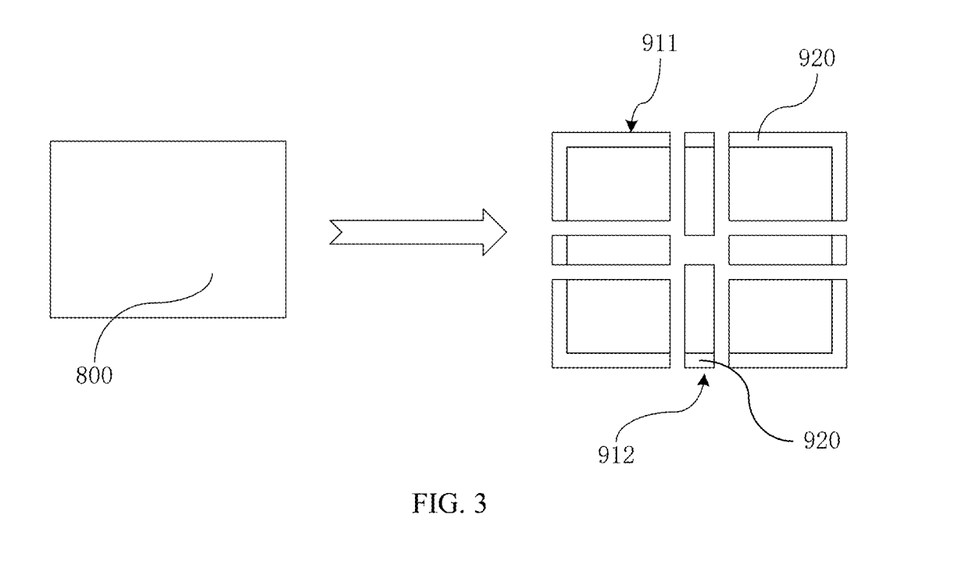
FIG. 3 is a schematic diagram of image changes in another embodiment of the splicing screen display device according to the embodiment corresponding to FIG. 1.

Referring to FIGS. 1 to 3, the splicing screen display device includes a display module 100, a processing module 200, a transmitting module 300, and a driving module 400. The display module 100 includes a plurality of basic display modules 110 and at least one supplementary display module 120, and the supplementary display module 120 is disposed at a joint 130 of two of the basic display modules 110. The multiple basic display modules 110 can be arranged in a straight line to form a display screen with a larger screen-to-body ratio. The supplementary display module 120 is arranged at the joint 130 of adjacent ones of the basic display modules 110. This arrangement is suitable for scenes that require a wider field of vision, such as movie theaters, game halls, control centers, etc., and for scenes that have certain requirements on the width or height of the display screen, such as outdoor advertisements and so on. The basic display modules 110 can also be arranged in a matrix array to form a display screen with a normal screen-to-body ratio. The supplementary display module 120 is arranged at the joint 130 of adjacent ones of the basic display modules 110. This arrangement is suitable for scenes such as dispatching centers, indoor advertisements, outdoor advertisements, and so on.

The processing module 200 is connected to the display module 100 with electrical signals, and is configured to perform a first process on a received source image frame 800 to obtain a target sub-image frame 910 corresponding to each of the display modules 100, which includes the target sub-basic image frame 911 corresponding to the basic display module 110 and the target sub-supplementary image frame 912 corresponding to the supplementary display module 120. The transmitting module 300 is connected to the processing module 200 with electrical signals to receive the target sub-supplemental image frame 912 transmitted by the processing module 200 and perform a second process. The target sub-supplemental image frame 912 is the target sub-image frame 910 corresponding to the supplementary display module 120. The driving module 400 is disposed corresponding to the supplementary display module 120, and connected to the transmitting module 300 and the supplementary display module 120 with electrical signals, and configured to receive the target sub-supplemental image frame 912 transmitted by the transmitting module 300, and transmits the target sub-supplemental image frame 912 to the corresponding supplementary display module 120 after performing the third process.

The first process is to split the source image frame 800 into a target sub-basic image frame 911 corresponding to the basic display module 110, and a target sub-supplementary image frame 912 corresponding to the supplementary display module 120, and perform corresponding optimization of image quality; the second process is to further optimize the image quality of the target sub-supplemental image 912 accordingly; and the third process is to convert the received target sub-image 910 into a signal that can be displayed by the supplementary display module 120.

That is, in this embodiment, after the processing module 200 receives the source image frame 800, the first process is performed on the source image frame 800 to obtain the target sub-basic image frame 911 corresponding to the basic display module 110 and the target sub-supplementary image frame 912 corresponding to the supplementary display module 120, the target sub-basic image frame 911 is transmitted to the corresponding driver to drive the basic display module 110 for display, the target sub-supplemental image frame 912 is transmitted to the transmitting module 300, and then the transmitting module 300 performs the second process on the target sub-supplemental image frame 912, and then transmits the target sub-supplemental image frame 912 to the driving module 400 corresponding to the supplementary display module 120 to drive the supplementary display module 120 to display the corresponding image frame.

In some embodiments of the present disclosure, the processing module 200 includes a receiving submodule 210, a processing submodule 220, and a transmitting submodule 230.

The processing submodule 220 obtains a resolution information of the source image frame 800 and the splicing screen display device through the receiving submodule 210; then adds a border display area 920 at an outer side of the source image frame 800 and split the source image frame 800 to form the target sub-image frame 910 corresponding to each of the display modules 100; and finally transmits the target sub-image frame 910 to the corresponding display module 100 through the transmitting submodule 230 for display.

The resolution information includes a pixel width of the supplementary display module 120, and the pixel width is a pixel size of the supplementary display module 120 at the joint 130 in a width direction. The border display area 920 is parallel to the joint 130, and a sum of pixel widths of the border display area 920 that are parallel to each other is equal to a sum of pixel widths of the supplementary display module 120 that are parallel to each other. The target sub-image frame 910 includes a target sub-basic image frame 911 corresponding to the basic display module 110 and a target sub-supplementary image frame 912 corresponding to the supplementary display module 120.

In this embodiment, specific execution steps of the above-mentioned first process are to first obtain the resolution information of the source image frame 800 and the splicing screen display device. The resolution information includes the pixel width of each supplementary display module 120, and the pixel width is the pixel size of the supplementary display module 120 at the joint 130 in the width direction. Then, a border display area 920 is added at an outer side of the source image frame 800 to form the target sub-image frame 910 corresponding to each of the display modules 100; wherein the border display area 920 is parallel to the joint 130, and the border display area 920 is parallel to each other. The sum of pixel widths of the border display area 920 that are parallel to each other is equal to the sum of pixel widths of the supplementary display module 120 that are parallel to each other. Finally, each of the target sub-image frame 910 is transmitted to the corresponding display module 100 for display.

If there is a need to display an image frame on the splicing screen, it is necessary to first obtain the corresponding source image frame 800 and the relevant resolution information of the corresponding splicing screen display device in order to pre-process the image frame. The resolution information may include the resolution information for each display module 100, the position information of each display module 100, and the pixel width of each supplementary display module 120, etc. The pixel width is the pixel size of the supplementary display module 120 at the joint 130 in the width direction in order to facilitate determination of the pixel width that needs to be supplemented on the basis of the source image frame 800 and the image frame size allocated to each display module 100, so that each target sub-image frame 910 finally corresponds to the resolution of the corresponding display module 100. After obtaining the corresponding image and the related resolution information of the corresponding splicing screen display device, the pixel width to be supplemented on the image frame and the screen size allocated to each display module 100 can be determined according to the related resolution information. After each target sub-image frame 910 is obtained, each target sub-image frame 910 can be transmitted to each corresponding display module 100 for display.

In the embodiment of the present disclosure, the way to make each target sub-image frame 910 finally formed correspond to the resolution of the corresponding display module 100 is to add the border display area 920 at the outer side of the source image frame 800, and the border display area 920 is parallel to the joint 130, the sum of pixel widths of the border display area 920 that are parallel to each other is equal to the sum of pixel widths of the supplementary display module 120 that are parallel to each other. That is, in this embodiment, according to the pixel width of each supplementary display module 120, the border display area 920 parallel to the joint 130 is added at the outer side of the source image frame 800, and finally each of the target sub-image frame 910 is formed.

The above-mentioned border display area 920 can be configured as an area for displaying a decorative border, such as an area displayed as a border of various colors such as black; or it can also be configured as an area for displaying a functional border, such as an area displaying time, temperature, progress bar, and so on.

When the splicing screen display device is a display screen formed by a plurality of basic display modules 110 arranged in a straight line, the border display area 920 can be arranged at the outer side of the source image frame 800 parallel to the joint 130, and can also be set at outer sides of opposite sides of the source image frame 800 parallel to the joint 130. When the border display area 920 is disposed at the outer sides of the opposite sides of the source image frame 800 parallel to the joint 130, the pixel widths of the border display area 920 on opposite sides may be the same or different. When the pixel widths of the border display area 920 on opposite sides are the same, the source image frame 800 is set in the center, and the visual impression is better. When the pixel widths of the border display area 920 on opposite sides are different, the pixel widths of the border display area 920 are wider, and content that can be displayed is also richer.

When the splicing screen display device is a display screen constituted by a plurality of basic display modules 110 arranged in a rectangular array, the border display area 920 can be arranged at the adjacent two of the outer sides of the source image frame 800, or can be arranged at three of the outer sides of the source image frame 800, or can also be arranged at all the outer sides of the source image frame 800. Meanwhile, when the border display area 920 is arranged at the outer sides of more than three sides of the source image frame 800, the pixel widths of the border display area 920 on opposite sides may be the same or different. When the pixel widths of the border display area 920 on opposite sides are the same, the source image frame 800 is set in the center, and the visual impression is better. When the pixel widths of the border display area 920 on opposite sides are different, the pixel widths of the border display area 920 are wider, and the content that can be displayed is also richer. Meanwhile, the border display area 920 on the adjacent ones of the sides of the source image frame 800 may be respectively configured as an area for displaying a decorative frame and an area for displaying a functional frame.

Meanwhile, there are many implementations for adding the border display area 920 at the outer side of the source image frame 800. For example, the source image frame 800 is first divided into multiple sub-display image frames, and then the border display area 920 is added to the sub-display area located on the outermost side. It is also possible to add the border display area 920 to the source image frame 800 before dividing, which is not particularly limited in the present disclosure.

Figure 4:
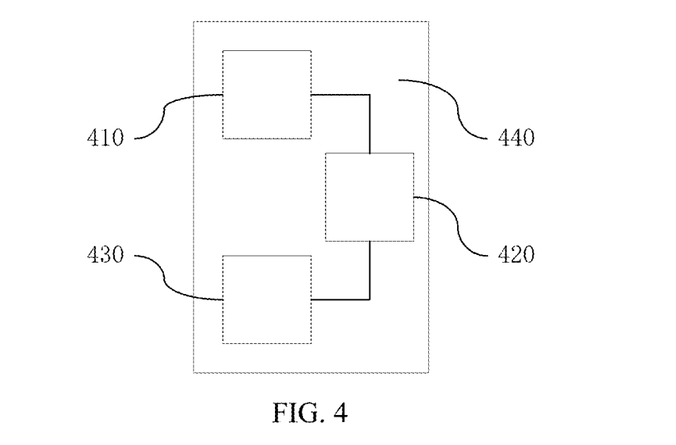
FIG. 4 is a schematic diagram of the architecture of a driving module provided by an embodiment of the present disclosure.

Also referring to FIG. 4, the driving module 400 includes a port unit 410, a driving unit 420, a distribution unit 430, and a substrate 440. The port unit 410, the driving unit 420, and the distribution unit 430 are all integrated on the substrate 440, and the port unit 410 is connected to the transmitting module 300 and the driving unit 420 with electrical signals, respectively. The distribution unit 430 is connected to the driving unit 420 and the supplementary display module 120 with electrical signals, respectively. The port unit 410 is configured to receive the target sub-supplementary image frame 912 transmitted by the transmitting module 300. The driving unit 420 is configured to perform the third process on the target sub-supplemental image frame 912 received by the port unit 410. The distribution unit 430 is configured to receive the target sub-supplemental image frame 912 processed by the driving unit 420, and the target sub-supplemental image frame 912 is transmitted to the corresponding supplementary display module 120 to make the supplementary display module 120 display.

That is, in this embodiment, the port unit 410 receives the target sub-supplemental image frame 912 transmitted by the transmitting module 300 and the target sub-supplemental image frame 912 is transmitted to the driving unit 420. The driving unit 420 performs the third process on the target sub-supplemental image frame 912 from the port unit 410, and then the distribution unit 430 controls the supplementary display module 120 to display the target sub-supplementary image frame 912.

Figure 7:
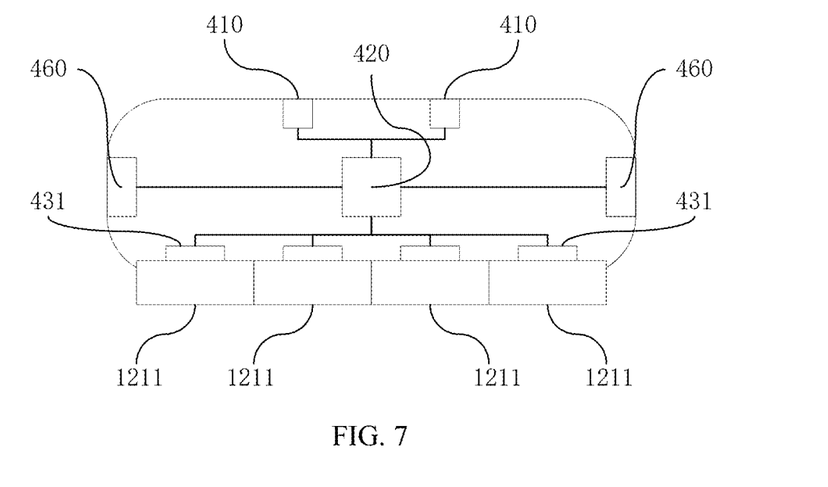
FIG. 7 is a schematic structural diagram of a main driving board provided by an embodiment of the present disclosure.

Also referring to FIG. 7, the distribution unit 430 correspondingly includes a plurality of display interfaces 431, and the supplementary display module 120 correspondingly includes a plurality of supplementary display units 1211. The display interfaces 431 are provided on the same side, and are docked and fixed with the corresponding supplementary display unit 1211 and realizes electrical signal connection. The supplementary display units 1211 are arranged and spliced sequentially along a direction of the joint 130. The distribution unit 430 transmits the corresponding display information to the corresponding supplementary display unit 1211 through each of the display interfaces 431.

Figure 8:
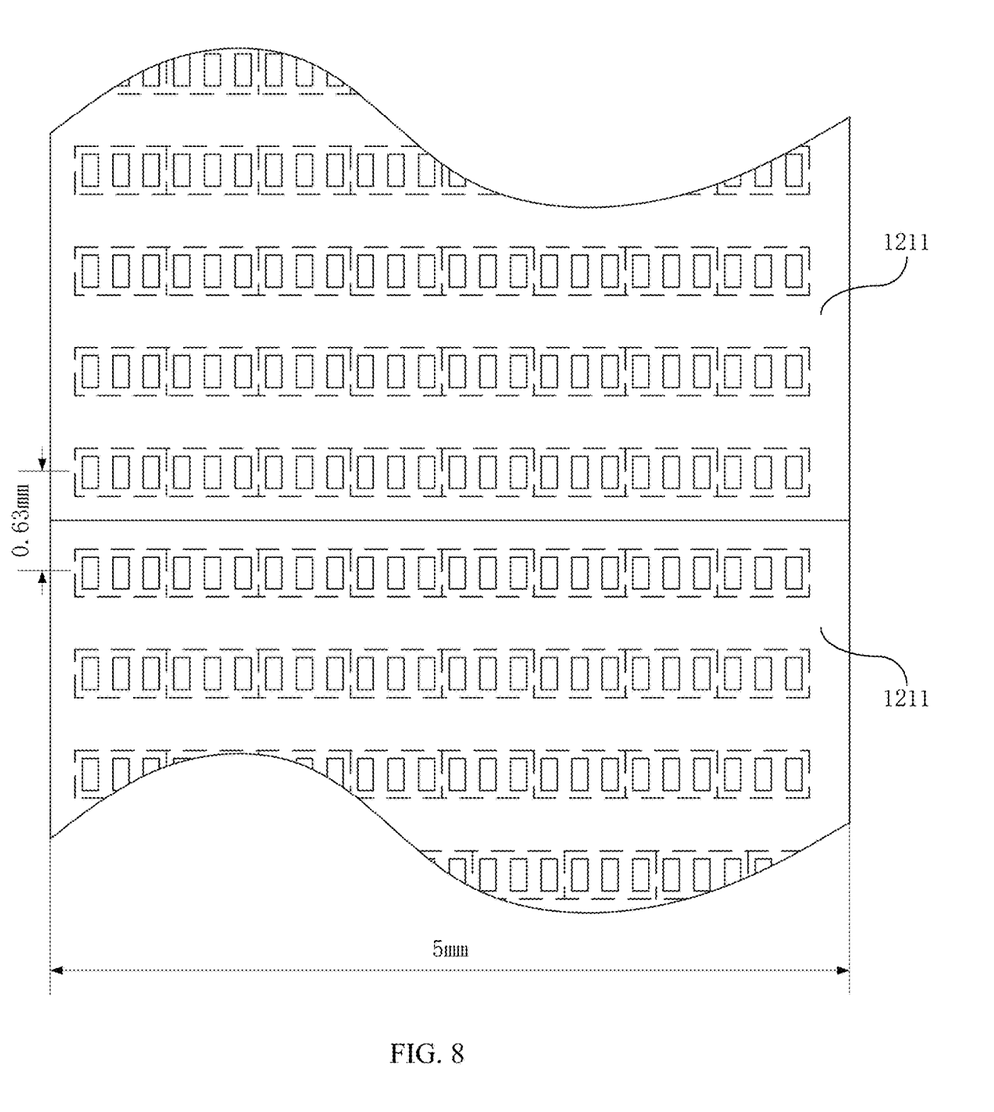
FIG. 8 is a schematic diagram of a partial structure of a supplementary display unit provided by an embodiment of the present disclosure.

In this embodiment, referring to FIG. 8, the above-mentioned supplementary display units 1211 are arranged in strips along the joint 130, the frame width of each supplementary display unit 1211 is less than 5 mm, and the pixel width of each supplementary display unit 1211 is greater than a sum of widths of 8 pixels, and the distance between adjacent pixels of adjacent ones of the supplementary display units 1211 is less than 0.63 mm to ensure that the pixel density of the supplementary display module 120 is closer to that of the basic display module 110, thereby giving users a better visual experience.

Figure 5:
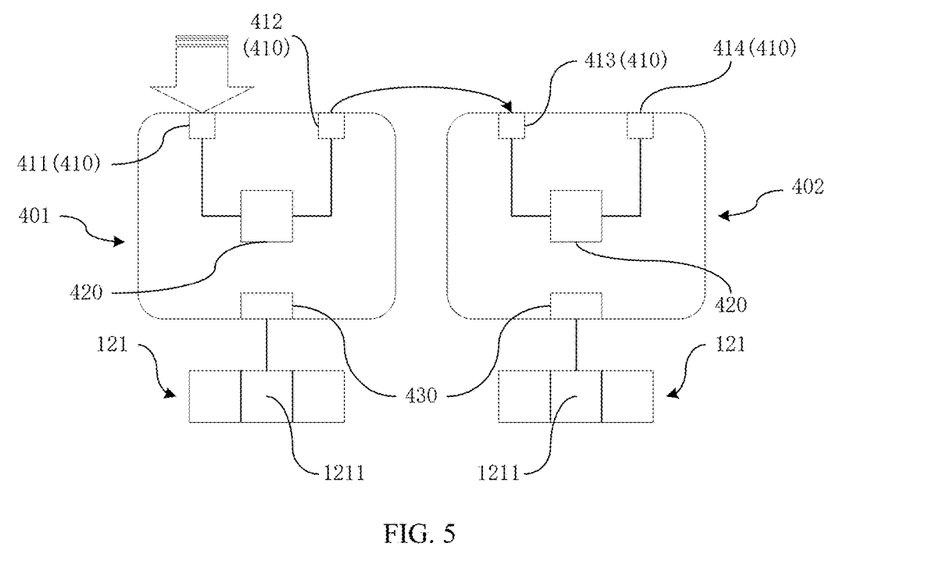
FIG. 5 is a schematic structural diagram of a driving module provided by an embodiment of the present disclosure.

In some embodiments of the present disclosure, also referring to FIG. 5, the above-mentioned driving module 400 includes two driving submodules, the main driving submodule 401 and the auxiliary driving submodule 402. Each of the driving modules 400 includes a main driving submodule 401 and at least one auxiliary driving submodule 402. The auxiliary driving submodule 402 is arranged at one side of the main driving submodule 401 along the joint 130. The supplementary display module 120 includes a plurality of supplementary display submodules 121 corresponding to the main driving submodule 401 and the auxiliary driving submodule 402, and each supplementary display submodule 121 correspondingly includes a plurality of supplementary display units 1211. Each of the main driving submodule 401 and the auxiliary driving submodule 402 is respectively connected to the supplementary display submodule 121 with electrical signals.

Each of the main driving submodule 401 and the auxiliary driving submodule 402 is provided with the port unit 410, the driving unit 420, and the distribution unit 430 thereon. The port unit 410 of the main driving submodule 401 includes a receiving port and a transmitting port, which are the main receiving port 411 and the main transmitting port 412, respectively. The port unit 410 of the auxiliary driving module 400 includes a receiving port, which is the auxiliary receiving port 413.

In this embodiment, the main receiving port 411 is connected to the transmitting module 300 with electrical signals, and the main transmitting port 412 is connected to the main receiving port 411 and the auxiliary receiving port 413 with electrical signals. The transmitting module 300 transmits the target sub-supplemental image frame 912 to the main receiving port 411. After the main transmitting port 412 receives the target sub-supplemental image frame 912, the target sub-supplemental image frame 912 is transmitted to the auxiliary receiving port 413 through the main transmitting port 412. Meanwhile, the main receiving port 411 also transmits the target sub-supplemental image frame 912 to the driving unit 420 on the main driving submodule 401 to control the supplementary display submodule 121 corresponding to the main driving submodule 401 to display. Similarly, after the auxiliary receiving port 413 receives the target sub-supplemental image frame 912, it transmits the target sub-supplemental image frame 912 to the driving unit 420 on the auxiliary driving submodule 402 to control the supplementary display submodule 121 corresponding to the auxiliary driving submodule 402 to display.

When there are multiple auxiliary driving submodules 402, the main transmitting port 412 can be connected to the auxiliary receiving port 413 of each auxiliary driving module 400 with electrical signals, and distribute the target sub-supplemental image frame 912 to each of the auxiliary driving submodules 402.

In the embodiment of the present disclosure, each of the auxiliary driving submodules 402 is also provided with a transmitting port, which is the auxiliary transmitting port 414. The main driving submodule 401 and each of the auxiliary driving submodules 402 are connected by cascade connection. The main driving submodule 401 and each of the auxiliary driving submodules 402 are arranged in sequence along the joint 130. The auxiliary transmitting ports of each of the auxiliary driving submodules 402 are all connected to the receiving port of an adjacent driving submodule with electrical signals. The auxiliary receiving port 413 of each of the auxiliary driving submodules 402 is connected to the transmitting port of another adjacent driving submodule with electrical signals. The main driving submodule 401 transmits the sub-supplemental display image frame to the auxiliary driving submodule 402 adjacent to the main driving submodule 401, and the auxiliary driving submodules 402 transmits the sub-supplemental display image frame to another auxiliary driving submodules 402 adjacent to the auxiliary driving submodule 402.

Figure 6:
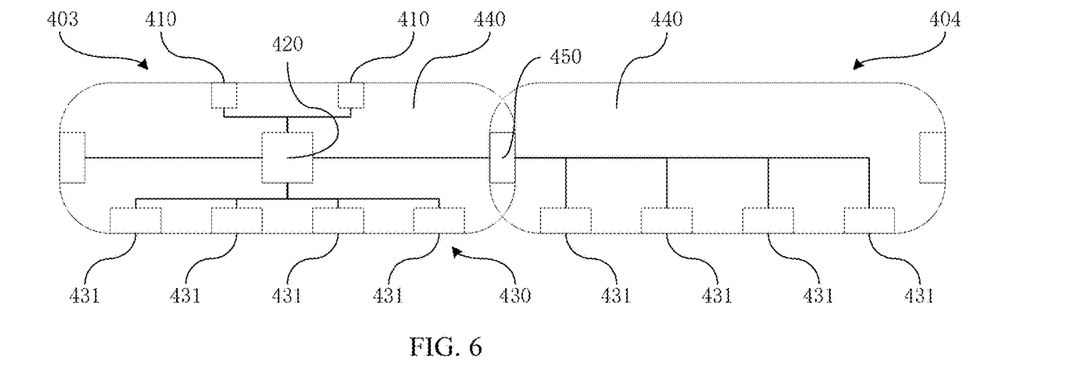
FIG. 6 is a schematic structural diagram of a driving submodule provided by an embodiment of the present disclosure.

In some embodiments of the present disclosure, referring to FIG. 6 and FIG. 7, the above-mentioned driving submodule includes at least one driving board, and the at least one driving board includes a substrate 440 and a port unit 410, a driving unit 420, and a distribution unit 430 disposed on the substrate 440.

When the above-mentioned driving submodule includes multiple driving boards, it includes a main driving board 403 and an auxiliary driving board 404 connected to the main driving board 403. Generally, a number of the auxiliary driving board 404 is one, but in other embodiments, the number of the auxiliary driving board 404 may also be two or more. The auxiliary driving board 404 is arranged at one side of the main driving board 403 along the joint 130, and realizes electrical connection and structural connection through an interface.

The main driving board 403 includes a substrate 440 and a port unit 410, a driving unit 420, a distribution unit 430, and an expansion interface 450 provided on the substrate 440. The driving unit 420 is arranged in the middle of the substrate 440, the port unit 410 and the distribution unit 430 are respectively arranged on opposite sides of the driving unit 420, and the expansion interface 450 is arranged at the end of the substrate 440. That is, the display interface 431 of the distribution unit 430 is arranged on a longer side of the substrate 440 along the joint 130, and the expansion interface 450 is arranged on a shorter side of the substrate 440 adjacent to the display interface 431.

The auxiliary driving board 404 includes the substrate 440, and the distribution unit 430 and an expansion interface 450 provided on the substrate 440. Consistent with the main driving board 403, the display interface 431 of the distribution unit 430 is arranged on the longer side of the substrate 440 along the joint 130, and the expansion interface 450 is arranged on the shorter side of the substrate 440 adjacent to the display interface 431.

The main driving board 403 and the auxiliary driving board 404 are docked and fixed to each other through the expansion interface 450 to realize electrical signal connection. The main driving board 403 transmits the corresponding target sub-supplemental image frame 912 to the auxiliary driving board 404 through the expansion interface 450.

That is, in this embodiment, after the processing module 200 receives the source image frame 800, the first process is performed on the source image frame 800 to obtain the target sub-basic image 911 corresponding to the basic display module 110 and the target sub-supplemental image frame 912 corresponding to the supplementary display module 120. Then, the processing module 200 transmits the target sub-basic image frame 911 to the corresponding driver module to drive the basic display module 110 for display, and transmits the target sub-supplemental image frame 912 to the transmitting module 300. The transmitting module 300 performs the second process on the target sub-supplemental image frame 912, and then transmits the target sub-supplemental image frame 912 to the driving module 400 corresponding to the supplementary display module 120.

The main driving board 403 of the main driving submodule 401 of the driving module 400 receives the above-mentioned target sub-supplemental image frame 912, and transmits the target sub-supplemental image frame 912 to the auxiliary driving submodule 402 through the main transmitting port 412, which is connected to the auxiliary driving submodule 402 with electrical signals. Meanwhile, the main driving board 403 of the main driving submodule 401 performs the third process through the driving unit 420 disposed on the main driving board 403, and converts the target sub-supplemental image frame 912 into an image signal that can be displayed by each of the supplementary display unit 1211, distributes the image signal to the display interface 431 disposed thereon, and enables the supplementary display unit 1211 to perform display. Meanwhile, the main driver board 403 also transmits the processed image signal to the auxiliary driving board 404 through the expansion interface 450, and distributes the processed image signal to the display interfaces 431 on the auxiliary driving board 404, so that the supplementary display unit 1211 docked on the auxiliary driving board 404 can also perform display. The auxiliary driving submodule 402 also includes the main driving board 403 and the auxiliary driving board 404, and its processing process is the same as that of the main driving module 400.

In other embodiments, a number of the driving board may also be only one. In this case, the driving board is the main driving board 403. The auxiliary driving board 404 is an extension accessory of the main driving board 403, which enables the driving unit 420 on the main driving board 403 to control as many supplementary display units 1211 as possible, so as to save production costs and speed up transmission efficiency.

The display device and the splicing screen display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A splicing screen display device, wherein the splicing screen display device comprises:
    display modules comprising a plurality of basic display modules and at least one supplementary display module, wherein the supplementary display module is disposed at a joint of two of the basic display modules;
    a processing module connected to the display modules with electrical signals and configured to perform a first process on a received source image frame to obtain a target sub-image frame corresponding to each of the display modules;
    a transmitting module connected to the processing module with electrical signals and configured to receive and perform a second process on a target sub-supplemental image frame transmitted by the processing module, wherein the target sub-supplemental image frame is the target sub-image frame corresponding to the supplementary display module, wherein the second process is to further optimize the image quality of the target sub-supplemental image; and
    a driving module disposed corresponding to the supplementary display module, and connected to the transmitting module and the supplementary display module with electrical signals,
    wherein the driving module comprises a substrate, and a driving unit and a distribution unit integrated on the substrate, the driving unit is connected to the distribution unit with electrical signals, the driving unit is configured to perform a third process on the received target sub-supplemental image frame and transmit the received target sub-supplemental image frame to the distribution unit; and wherein the distribution unit is connected to the supplementary display module with electrical signals, and the distribution unit is configured to receive the target sub-supplemental image frame processed by the driving unit and distributes the target sub-supplemental image frame to a corresponding one of the supplementary display modules for the supplementary display module to display,
    wherein the driving module comprises a driving board, and the driving board comprises the substrate, and a port unit, the driving unit, and the distribution unit disposed on the substrate,
    wherein the driving board comprises:
    a main driving board comprising the substrate, the port unit, the driving unit, the distribution unit, and an expansion connector;
    an auxiliary driving board disposed at one side of the main driving board along the joint, and comprising the substrate, the distribution unit, and the expansion connector, wherein the main driving board is docked and fixed to the auxiliary driving board through the expansion connector to realize electrical signal connection,
    wherein only the main driving board comprises the driving unit, and the driving unit is electrically connected to a plurality of display interfaces on both the main driving board and the auxiliary driving board to enable both the main driving board and the auxiliary driving board to emit light.

2. The splicing screen display device according to claim 1, wherein after receiving the target sub-supplemental image, and after the third process is performed through the driving unit on the main driving board, the target sub-supplemental image is converted into an image signal that can be displayed by each of the supplementary display units, the image signal is correspondingly distributed to a display interface on the supplementary display unit, and the supplementary display unit is made to display through a display interface.

3. The splicing screen display device according to claim 1, wherein the main driving board transmits a processed image signal to the auxiliary driving board through an expansion interface, the processed image signal is distributed to each of the plurality of display interfaces on the auxiliary driving board, so that the supplementary display unit docked on the auxiliary driving board also displays.

4. The splicing screen display device according to claim 1, wherein the display connectors are disposed at one side of the substrate along the joint, and the expansion connector is disposed on the substrate at another side of the substrate adjacent to the side where a plurality of display connectors are disposed.

5. The splicing screen display device according to claim 1, wherein the driving module further comprises:
the port unit connected to the driving unit and the transmitting module with electrical signals and configured to receive the target sub-supplemental image frame transmitted by the transmitting module, and transmit the target sub-supplemental image frame to the driving unit.

6. The splicing screen display device according to claim 5, wherein the supplementary display module comprises a plurality of supplementary display units, and the distribution unit correspondingly comprises a plurality of display connectors, the display connectors are disposed on a same side, and the display connectors are docked and fixed to a corresponding one of the supplementary display units to realize electrical signal connection.

7. The splicing screen display device according to claim 6, wherein the supplementary display units are disposed in strips along the joint, a border width of each of the supplementary display units is less than 5 mm, and a pixel width of each of the display units is greater than a sum of widths of 8 pixels.

8. The splicing screen display device according to claim 6, wherein a distance between adjacent ones of pixels of adjacent ones of the supplementary display units is less than 0.63 mm.

9. The splicing screen display device according to claim 5, wherein the driving module comprises a plurality of driving submodules, each of the driving submodules comprises a main driving submodule and an auxiliary driving submodule disposed at one side of the main driving submodule along the joint, and the main driving submodule transmits the target sub-supplemental image to the auxiliary driving sub-module.

10. The splicing screen display device according to claim 9, wherein the port unit is disposed on each of the main driving submodule and the auxiliary driving submodule, and the port unit comprises a receiving port and a transmitting port;

wherein the receiving port of the main driving submodule is a main receiving port, the receiving port of the auxiliary driving submodule is an auxiliary receiving port, and the transmitting port of the main driving submodule is a main transmitting port; and wherein the main receiving port is connected to the transmitting module with electrical signals and configured to receive the target sub-supplemental image frame transmitted by the transmitting module, the main transmitting port is connected to the main receiving port and the auxiliary receiving port with electrical signals and configured to transmit the target sub-supplemental image frame received by the main receiving port to the auxiliary receiving port.

11. The splicing screen display device according to claim 9, wherein a number of auxiliary driving submodules is multiple, and the main driving submodule and each of the auxiliary driving submodules are connected by cascade connection.

12. The splicing screen display device according to claim 11, wherein the main driving submodule and each of the auxiliary driving submodules are arranged in sequence along the joint.

13. The splicing screen display device according to claim 9, wherein the driving submodule comprises at least one driving board, and the at least one driving board comprises:
a main driving board comprising the substrate, the port unit, the driving unit, the distribution unit, and an expansion connector;
an auxiliary driving board disposed at one side of the main driving board along the joint, and comprising the substrate, the distribution unit, and the expansion connector, wherein the main driving board is docked and fixed to the auxiliary driving board through the expansion connector to realize electrical signal connection.

14. The splicing screen display device according to claim 9, wherein the supplementary display module comprises a plurality of supplementary display submodules corresponding to the main driving submodule and the auxiliary driving submodules, and each of the main driving submodule and the auxiliary driving submodules is respectively correspondingly connected to the supplementary display submodules with electrical signals.

15. The splicing screen display device according to claim 14, wherein each of the supplementary display submodules correspondingly comprises a plurality of supplementary display units.

16. The splicing screen display device according to claim 1, wherein the processing module comprises:
a receiving submodule configured to obtain the source image frame and a resolution information of the splicing screen display device, wherein the resolution information comprises a pixel width of the supplementary display module, and the pixel width is a pixel size of the supplementary display module at the joint in a width direction;
a processing submodule configured to add a border display area at an outer side of the source image frame and split the source image frame to form the target sub-image frame corresponding to each of the display modules, wherein the border display area is parallel to the joint, and a sum of pixel widths of the border display area that are parallel to each other is equal to a sum of pixel widths of the supplementary display module that are parallel to each other; and a transmitting submodule configured to transmit each of the target sub-image frame to a corresponding one of the display modules for display.

17. The splicing screen display device according to claim 16, wherein the splicing screen display device is a display screen formed by a plurality of basic display modules arranged in a straight line, and the border display area is arranged near at least one outer side of the source image frame parallel to the joint.

18. The splicing screen display device according to claim 16, wherein the splicing screen display device is a display screen constituted by a plurality of basic display modules arranged in a rectangular array, and the border display area is arranged at adjacent two of the outer sides of the source image frame.

* * * * *